April 24, 1951 B. D. LOUGHLIN 2,550,486

WAVE-SIGNAL TRANSFORMER

Filed June 26, 1946

INVENTOR.
BERNARD D. LOUGHLIN

BY

ATTORNEY

Patented Apr. 24, 1951

2,550,486

UNITED STATES PATENT OFFICE 2,550,486

WAVE-SIGNAL TRANSFORMER

Bernard D. Loughlin, Bayside, N. Y., assignor to Hazeltine Research, Inc., Chicago, Ill., a corporation of Illinois Application June 26, 1946, Serial No. 679,534

3 Claims. (Cl. 171—242)

Figure 1:
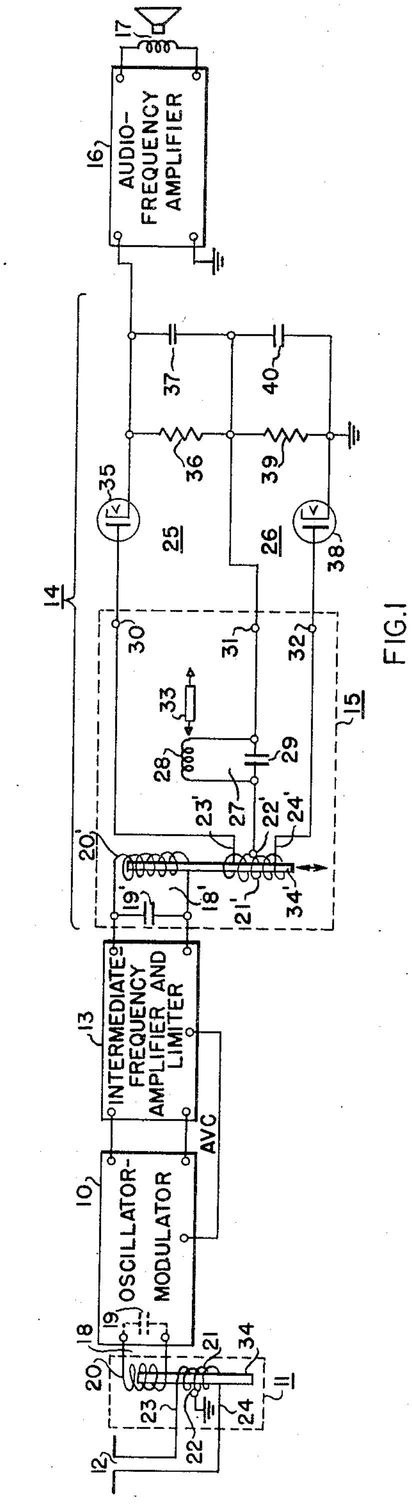

The present invention relates to wave-signal transformers and, particularly, to such transformers of the permeability-tuned type.

It is frequently desirable to utilize a wave-signal transformer to couple a balanced wave-signal circuit to an unbalanced wave-signal circuit, or vice versa. For example, high-frequency receiving systems conventionally utilize a half-wave antenna, which is inherently balanced, coupled through a balanced transmission line and a wave-signal transformer to an unbalanced input circuit of a wave-signal receiver. It is desirable in such arrangements that balanced wave-signal energy be translated from the line to the receiver input circuit but that any unbalanced energy appearing on the line, such as that caused by local electrical disturbances, be not translated to the receiver. It is usually further desirable that the unbalanced circuit winding of the transformer be included in a resonant circuit tunable to a desired wave-signal frequency and that the transformer windings have such value of coupling and be so loaded by one or more external resistive impedances as to provide a desired value of band width over which wave-signal energy is translated with substantially uniform amplitude. At the same time, it is usually essential that the tuning of the resonant circuit should not create any unbalance of the balanced wave-signal circuit nor should it cause any substantial variation of the coefficient of coupling between the circuits and thereby of the selected value of band width.

As illustrative of a class of applications in which it is desired to translate wave-signal energy from an unbalanced wave-signal circuit to a balanced wave-signal circuit, the frequency discriminator of certain types of heretofore proposed frequency-modulation detectors may be mentioned. The frequency discriminator in these arrangements utilizes a wave-signal transformer having a primary winding included in an unbalanced tunable wave-signal circuit and having at least two secondary-winding portions which develop equal or balanced wave-signal potentials at a given wave-signal frequency. These potentials are utilized to provide two additional wave-signal potentials varying oppositely in amplitude with the frequency deviation of a frequency-modulated wave signal coupled to the transformer, the latter potentials in turn being utilized to derive in an output circuit of the detector the modulation components of the frequency-modulated wave signal. In such frequency detectors, the mutual coupling existing between the transformer windings has an important bearing on the operating characteristics of the detector, so that it is desirable that tuning of the primary resonant circuit should neither substantially alter the value of coupling selected to provide the best detector characteristics nor should it create any unbalance between the voltages developed by the secondary-winding portions.

In many applications employing transformer arrangements of the type hereinbefore mentioned, the unbalanced resonant wave-signal circuit is operated at a given fixed wave-signal frequency. However, it is necessary to make provision for tuning this resonant circuit over at least a small frequency range, such as necessitated during the initial adjustment of the wave-signal apparatus or as necessitated from time to time during extended periods of its operation. The reasons for this are well known.

The limited tuning range last mentioned frequently is provided by the use of a small trimmer condenser coupled across the unbalanced resonant circuit and having a limited range of capacitance adjustment. There are, however, numerous instances where even slight changes in the capacity of the trimmer condenser after an initial adjustment substantially impairs the operation desired of the coupled wave-signal circuits. Notwithstanding careful precaution in the design and construction of such trimmer condensers, it is quite difficult over extended periods of time to prevent these small capacitance changes by virtue of warping of the condenser plates, aging of the dielectric employed therein, variations of temperature and humidity to which the condenser is subjected, and the like.

It has therefore been proposed that rather high-quality trimmer condensers of fixed capacitance be used in conjunction with the unbalanced resonant circuit of the transformer and that the resonant circuit be then adjusted to the desired wave-signal frequency by permeability tuning. Permeability tuning has numerous well-known advantages and is accomplished by associating an adjustable magnetic core with the transformer winding which is included in the tunable resonant circuit. The core is movable relative to its associated transformer winding to adjust the resonant frequency of the resonant circuit by adjustment of the inductance of the winding.

In wave-signal transformer arrangements heretofore proposed for coupling a balanced wave-signal circuit to an unbalanced wave-signal circuit, or vice versa, permeability tuning of any transformer winding tends to vary the coefficient of coupling between the windings and further tends undesirably to disturb the desired balance of the balanced wave-signal circuit. It has therefore been considered very undesirable to utilize permeability tuning in such wave-signal transformers.

It is an object of the present invention, therefore, to provide a new and improved wave-signal transformer of the permeability-tuned type which avoids one or more of the disadvantages and limitations of prior wave-signal transformers.

It is a further object of the invention to provide a wave-signal transformer in which one or all of the tunable windings of the transformer may be permeability tuned without undesirably or detrimentally disturbing the magnitude of coupling between two fixed coupled windings or without undesirably disturbing the balance of one or more balanced transformer windings.

It is an additional object of the invention to provide a balanced-to-unbalanced wave-signal transformer of the permeability-tuned type and one which therefore possesses the compactness, efficiency and other advantages characteristic of permeability tuning.

In accordance with a particular form of the invention, a wave-signal transformer comprises a first winding adapted to be included in a circuit tuned to resonance at the frequency of a wave signal coupled to the winding, and a plurality of other windings each having relative to the first winding a wave-signal potential ratio substantially equal to that of the others of the last-mentioned windings. The transformer includes a movable unitary magnetic core coupling the windings and movable as a unit axially of all of the windings to adjust the tuning of the aforementioned resonant circuit by adjustment of the inductance of the first winding, said core having a length at least equal to the total effective axial length of all of the windings through which the core is axially movable and being of a length to maintain substantially undisturbed over the range of movement of the core the magnitude of coupling of the windings and the aforementioned equality of the potential ratios.

For a better understanding of the present invention, together with other and further objects thereof, reference is had to the following description taken in connection with the accompanying drawing, and its scope will be pointed out in the appended claims.

Figure 3:
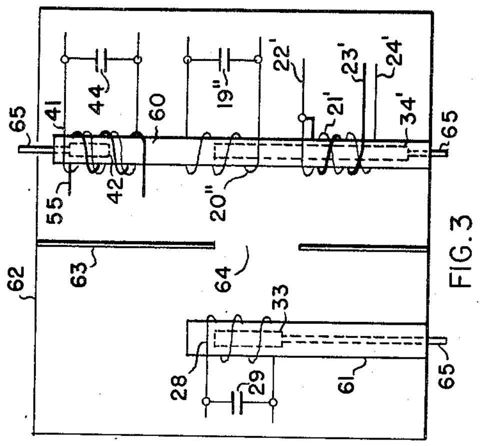
Figure 2:
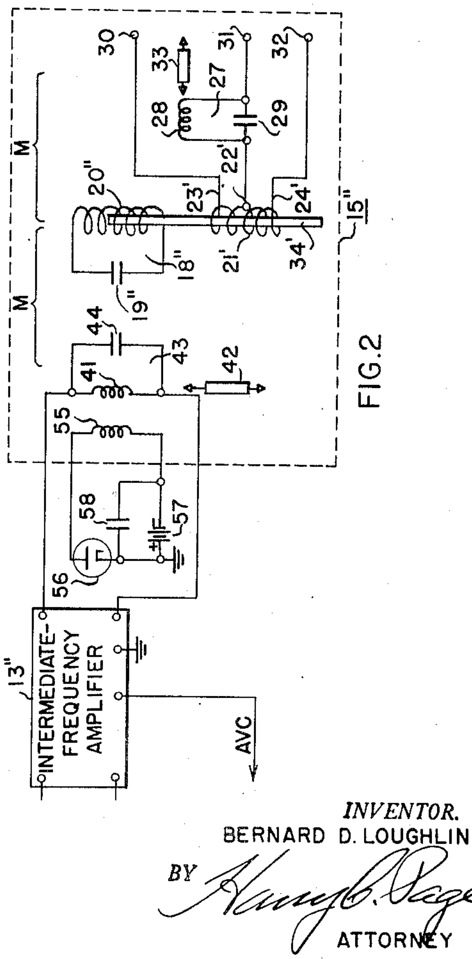

Referring to the drawing, Fig. 1 is a circuit diagram, partly schematic, of a complete frequency-modulation receiver which includes two wave-signal transformers embodying the present invention in a particular form; Fig. 2 is a circuit diagram of a wave-signal transformer embodying a modified form of the invention; and Fig. 3 schematically illustrates a suitable constructional arrangement for the wave-signal transformer of the type utilized in the Fig. 2 arrangement.

Referring now more particularly to Fig. 1 of the drawing, there is represented, partly schematic, a complete frequency-modulation receiver of conventional arrangement which utilizes two wave-signal transformers embodying the present invention in a particular form. In general, the receiver includes an oscillator-modulator 10 having an unbalanced wave-signal input circuit coupled to a radio-frequency wave-signal transformer 11, more fully described hereinafter, which in turn is coupled to a balanced wave-signal antenna system 12. Connected in cascade with the oscillator-modulator, in the order named, are an intermediate-frequency amplifier and limiter 13, a frequency detector 14 utilizing a wave-signal transformer 15, more fully described hereinafter, an audio-frequency amplifier 16 of one or more stages, and a sound reproducer 17. An automatic amplification control or AVC potential is derived in unit 13 and is applied to the input circuit of one or more of the tubes of the intermediate-frequency amplifier of this unit and to the input circuit of the converter tube of unit 10 in conventional manner.

It will be understood that the various units thus described may, with the exception of the wave-signal transformers 11 and 15, be of a conventional construction and operation, the details of which are known in the art, rendering further detailed description thereof unnecessary. Considering briefly the operation of the receiver as a whole, and neglecting for the moment the detailed operation of the wave-signal transformers 11 and 15 presently to be described, a desired frequency-modulated wave signal is translated by the resonant input circuit of the oscillator-modulator 10, converted in unit 10 to a frequency-modulated intermediate-frequency wave signal which is amplified by the intermediate-frequency amplifier of unit 13 and limited to a substantially uniform amplitude level by the limiter thereof, and detected by the frequency detector 14, thereby to derive the audio-frequency modulation components. The audio-frequency components are, in turn, amplified in the audio-frequency amplifier 16 and are reproduced by the sound reproducer 17 in a conventional manner. The automatic amplification control or AVC bias developed in the unit 13 is effective to control the amplification of one or more of units 10 and 13 to maintain the signal input to the limiter of unit 13 within a relatively narrow range for a wide range of received signal intensities.

Referring now more particularly to the portion of the receiver embodying the present invention, the wave-signal transformer 11 includes a first winding 20 adapted to be included in a resonant circuit 18. The latter includes a condenser 19, shown in broken lines for the reason that it may be comprised in whole or in part of the input-circuit capacitances of the unit 10, coupled in shunt to the winding 20. The resonant circuit 18 is tuned, in a manner presently to be explained, to resonance at the frequency of a wave signal coupled to the winding 20. In particular, the resonant circuit 18 has a broad band-pass characteristic provided in a manner presently to be explained and is resonant at the mean frequency of the pass band last mentioned. The transformer 11 also includes a plurality of other windings each having relative to the first winding 20 a wave-signal potential ratio substantially equal to that of the others of the last-mentioned windings. In particular, such plurality of other windings comprise an untuned winding 21 coaxially arranged with the winding 20 and having a grounded center tap 22 to provide windings 22, 23 and 22, 24 which are included in series balanced relationship in circuit with the antenna system 12. The winding 22, 23 thus develops in the winding 20 wave-signal potentials of magnitude substantially equal to that developed in the winding 20 by the winding 22, 24. In this regard, the windings 22, 23 and 22, 24 preferably are wound one over the other, in a manner presently to be described, to maintain equal capacitive and inductive couplings between each of these windings and the winding 20. The windings 22, 23 and 22, 24 may, however, be wound as a continuous layer winding coaxial with the winding 20 but having slightly unequal numbers of turns to maintain equality of the voltages developed in the winding 20 by each of the windings 22, 23 and 22, 24.

The transformer 11 also includes a movable unitary magnetic core 34 coupling the first winding 20 and the other windings 22, 23 and 22, 24 and movable as a unit coaxially of the windings to adjust the tuning of the resonant circuit 18 by adjustment of the inductance of the winding 20, said core having a length at least equal to the total effective axial length of all of the windings through which the core is axially movable and being of a length to maintain substantially undisturbed over the range of movement of the core 34 the magnitude of coupling of the windings 20 and 21 and the aforementioned equality of the potential ratios of each of the windings 22, 23 and 22, 24 with the winding 20. In particular, the core 34 has a sufficient length that, for any position of the core in its range of movement, the core extends completely through the winding 21 and through a substantial portion of the winding 20 so that any movement of the core is not effective substantially to modify the inductance of any portion of the winding 21 or detrimentally to modify the coupling between the winding 20 and the windings 22, 23 and 22, 24. The core 34 may be of powdered iron held together by a suitable dielectric binder.

Before considering the similar wave-signal transformer 15 used in the frequency detector 14, the operation of the transformer 11 will be described. The winding 21 of the transformer is included in the balanced circuit of the wave-signal antenna system 12 and is coupled by the core 34 to the winding 20 which is included in the unbalanced wave-signal input circuit of the unit 10. By virtue of the fact that the wave-signal potential ratio of the winding 22, 23 relative to the winding 20 is substantially equal to that between the winding 22, 24 and the winding 20, wave-signal energy appearing in the balanced antenna system 12 is translated to the resonant circuit 18. Any unbalanced energy appearing in the antenna system, such as caused by local electrical disturbances, is not translated in any substantial amount to the resonant circuit 18.

The winding 21 is relatively tightly coupled to the winding 20 by the magnetic core 34. The coefficient of coupling in this regard is sufficiently large that the resonant circuit 18, when damped by the resistive impedance of the antenna system 12 and the input-circuit conductance of the unit 10, is broadly resonant to effect translation with substantially uniform translation efficiency of wave signals having any frequency within a relatively wide frequency range. The resonant circuit 18 is tuned to the mean frequency of the last-mentioned range by movement of the core 34 which is effective to adjust the tuning of the resonant circuit by adjustment of the inductance of the winding 20. As earlier mentioned, however, the core 34 has a length sufficient to maintain substantially undisturbed or unimpaired, over the range of movement of the core, the magnitude of coupling between the windings of transformer 11 and the equality of the potential ratios between the winding 20 and each of windings 22, 23 and 22, 24. In a practical embodiment of the transformer 11, the transformer effected a close impedance match between the input circuit of the unit 10 and the antenna system 12 and had a 20 megacycle pass band at a mean frequency of 98 megacycles. In obtaining this pass band, the antenna-system impedance of 300 ohms provided approximately two-thirds of the desired total resistive damping of the resnoant circuit 18 while the input-circuit conductance of unit 10 provided the remaining one-third of the damping. The ratio of the balanced energy translated by the transformer to the unbalanced energy translated thereby was 40 decibels.

As illustrative of a specific embodiment of the transformer 11 when used as the antenna transformer of a wave signal received as shown in Fig. 1, the following values have been found suitable:

Winding 20—3 turns No. 26 DSE wire close wound on ⅜ inch diameter winding form.

Each of windings 22, 23 and 22, 24—2¼ turns No. 26 DSE wire close wound, one over the other, on the winding form last mentioned.

Spacing between the winding 20 and the windings 22, 23 and 22, 24—$\frac{1}{32}$ inch Input capacitance 19—approximately 6–7 micro-microfarads.

Except for the frequency of the wave signal translated, the wave-signal transformer 15 used in the frequency detector 14 has a construction similar to that of the transformer 11 and similar elements are designated by similar reference numerals primed. The transformer 15 is provided with a first winding 20′ included in a resonant circuit 18′ having a condenser 19′ coupled in shunt to the winding 20′ and adapted to be tuned to resonance at a frequency within the range of a frequency-modulated wave signal coupled to the winding 20′. In particular, the condenser 19′ and winding 20′ are tuned to the mean frequency of the intermediate-frequency wave signal applied to the detector 14. The transformer 15 also includes an untuned secondary winding 21′ coaxially arranged with the winding 20′ and adapted to develop relative to a center tap 22′ of the secondary winding balanced wave-signal potentials. The secondary winding 21′ thus includes two winding portions 22′, 23′ and 22′, 24′ for developing balanced wave-signal potentials and is adapted to be coupled to individual rectifier systems 25, 26, respectively, of the frequency detector 14 by which to derive in an output circuit of the detector the modulation components of the frequency-modulated wave signal applied to the detector.

The transformer 15 also includes a parallel-resonant circuit 27 comprising an inductor 28 inductively coupled to the first winding 20′ and a condenser 29 coupled in shunt to the inductor 28. This resonant circuit 27 is connected to the center tap 22′ of the secondary winding 21′ to provide a three-terminal network having pairs of terminals 30, 31 and 31, 32 adapted to be coupled to the individual rectifier systems 25 and 26, respectively, of the frequency detector 14. A movable magnetic core 33, which provides permeability tuning and may be of powdered iron held together by a suitable dielectric binder, is associated with the inductor 28 to tune the resonant circuit 27 to the mean frequency of the frequency-modulated wave signal applied to the detector 14. The transformer 15 additionally includes a movable unitary magnetic core 34′ coupling the first winding 20′ and the secondary winding 21′ and movable as a unit axially of the windings to adjust the tuning of the resonant circuit 18′ by adjustment of the inductance of the winding 20', but having a core length sufficient to maintain substantially undisturbed over the range of movement of the core 34' the magnitude of coupling of the windings 20' and 21' and the aforementioned balance of the secondary winding portions 22', 23' and 22', 24'. In particular, the core 34' has a sufficient length that, for any position of the core in its range of movement, the core extends completely through the secondary winding 21' and through a substantial portion of the winding 20' so that any movement of the core is not effective substantially to modify the inductance of the secondary winding or detrimentally to modify the coupling between the first and secondary windings. The core 34' may be of powdered iron held together by a suitable dielectric binder.

The rectifier system 25 of the frequency detector 14 includes a diode rectifier 35 having a diode load impedance comprising a resistor 36 and shunt condenser 37. The rectifier system 26 similarly includes a diode rectifier 38 and rectifier load impedance comprising a resistor 39 and shunt condenser 40. As is conventional, the output circuits of the rectifier systems 25 and 26 are differentially connected to provide an output circuit for the frequency detector 14, this output circuit being coupled to an input circuit of the audio-frequency amplifier 16.

Considering now the operation of the wave-signal transformer 15 just described, the untuned secondary winding 21' is inductively coupled by the core 34' with the first winding 20' and is included with the parallel-resonant circuit 27 in a three-terminal network commonly called a frequency discriminator or slope filter. The resonant circuit 18' is tuned to the mean frequency of the intermediate-frequency wave signal applied to the detector 14 by axial adjustment of the core 34', movements of which are effective to vary the inductance of the winding 20'.

It was earlier mentioned that the core 34' has a sufficient length, however, that it extends completely through the secondary winding 21' and through a substantial portion of the first winding so that any movement of the core within its desired range of movement has no appreciable effect upon the inductance of the secondary winding 21' nor do such movements appreciably or detrimentally affect the magnitude of inductive coupling between the winding 20' and the secondary winding 21'. The wave-signal voltages induced in the secondary winding 21' are thus dependent mainly upon the resonant tuning of the resonant circuit 18' assuming, of course, that the wave-signal potentials applied to the circuit 18' are maintained constant during adjustment of the core 34'. This permits the magnitude of inductive coupling between the winding 20' and secondary winding 21' to be preselected at the correct value for best performance of the frequency detector 14 and permits the resonant circuit 18' to be tuned by the core 34' without substantially or detrimentally disturbing the preselected magnitude of coupling between these windings.

At the same time, movements of the core 34' do not affect the desired balance between the portions 22', 23' and 22', 24' of the secondary winding 21', the balanced condition of the secondary winding being effective to develop equal wave-signal voltages between the two winding portions 22', 23' and 22', 24' to ensure a zero output of the detector 14 at the mean frequency of the applied wave signal. As will presently be pointed out, and while not indicated in Fig. 1, this balanced condition is preferably accomplished by winding the secondary winding portion 22', 23' over the turns of the secondary winding portion 22', 24', or vice versa, to ensure equal capacitive and inductive couplings between each winding portion and the winding 20'.

The parallel-resonant circuit 27 of the transformer 15 also is tuned to the mean frequency of the frequency-modulated wave signal applied to the detector 14, this tuning being accomplished by movement of the core 33 which is effective to adjust the inductance of the inductor 28.

When the resonant circuits 18' and 27 are tuned to the mean frequency of the applied wave signal as described, the three-terminal network or frequency discriminator comprising the secondary winding 21' and the resonant circuit 27 is effective to develop across the pairs of terminals 30, 31 and 31, 32 wave-signal voltages equal to the vectorial sums of the voltages developed across each half of the secondary winding 21' and the resonant circuit 27. The wave signal developed across the pair of terminals 30, 31 varies in magnitude in opposite sense to that developed between the pair of terminals 31, 32 with deviation of the applied wave signal from its mean frequency.

The wave-signal voltages last mentioned are applied to individual ones of the rectifier systems 25 and 26 which operate in conventional manner to derive in the output circuit of the frequency detector 14 the modulation components of the frequency-modulated wave signal applied to the detector. These modulation components are applied to the audio-frequency amplifier 16 for amplification and eventual reproduction as earlier described.

Fig. 2 is a circuit diagram of a wave-signal transformer embodying the present invention in a modified form which is essentially similar to the frequency-discriminator transformer arrangement of Fig. 1, similar elements being designated by similar reference numerals and analogous elements by similar reference numerals double primed. The transformer 15'' of the present arrangement includes a transformer primary winding 41 adapted to be tuned by a magnetic core 42 to resonance at the mean frequency of a frequency-modulated wave signal applied thereto from the intermediate-frequency amplifier of unit 13''. The primary winding 41 is included in a parallel-resonant circuit 43 which includes a condenser 44. A transformer winding 55 is coupled to the winding 41 and is included in an amplitude limiter circuit comprising a rectifier 56 and a source of bias potential 57 having a condenser 58 connected in shunt thereto. The transformer primary winding 41 is inductively coupled only to the first winding 20'' of the transformer 15'', while the latter winding is coupled both to the secondary winding 21' and the inductor 28 of the resonant circuit 27.

In the operation of this modified form of the invention, the resonant circuits 18'', 27 and 43 are tuned by the respective magnetic cores 34', 33 and 42 to the mean frequency of the frequency-modulated wave signal applied to the primary winding 41. The amplitude limiting system which includes the rectifier 56 is effective to remove amplitude variations of the applied wave signal whenever the amplitude of the latter exceeds the threshold limiting level established by the value of the bias source 57. The limiting action is effective to maintain a substantially constant wave-signal potential across the resonant circuit 43 and this in turn is effective to maintain a substantially constant value of induced voltage in the winding 20' of the resonant circuit 18', thereby to facilitate the attainment of linearity of the detector characteristic. The operation of this modified form of the invention is otherwise essentially similar to that described in connection with Fig. 1 and will not be repeated.

Fig. 3 illustrates schematically a frequency-discriminator transformer construction of the Fig. 2 type. Elements of Fig. 3 corresponding to similar elements of Fig. 2 are designated by similar reference numerals. The transformer includes a cylindrical form 60 of insulating material upon which the primary winding 41 and winding 55 are wound at one end, the winding 20'' is wound at an intermediate region, and the secondary winding 21' is wound at the opposite end. The secondary winding portions 22', 23' and 22', 24' are shown wound in the superimposed relation earlier mentioned for purposes of providing balanced secondary winding portions. The transformer inductor 28 is wound upon a similar cylindrical form 61 of insulating material. The forms 60 and 61 are supported by any suitable means in parallel relation within an enclosing conductive shield housing 62 which includes a conductive diaphragm or baffle 63 positioned between the winding forms 60 and 61 but having an aperture 64 to permit inductive coupling of the inductor 28 with the winding 20'' but minimized coupling with the primary winding 41. The magnetic cores 33, 34' and 42 are axially movable of their associated windings by rods 65, preferably screw-threaded to provide a screw-threaded adjustment, extending externally of the housing 62. This transformer construction permits the inductor 28 and the secondary winding 21' to be coupled substantially only to the winding 20'', the latter being in turn coupled to the primary winding 41. The fixed condensers 19'', 29 and 44 preferably are positioned within the housing 62 and electrically connected to their associated windings during assembly of the transformer.

As illustrative of a specific embodiment of the invention, the following circuit constants are given for an embodiment of the invention of the Fig. 3 type:

Winding 20''—23 turns No. 32 DSE wire close wound
Windings 22', 23' and 22', 24'—each 9 turns No. 36 enameled wire close wound
Inductor 28—27 turns, No. 36 SSE close wound
Spacing between winding 20'' and windings 22', 23' and 22', 24'—1/16 inch
Winding 41—35 turns No. 32 enameled wire close wound
Winding 55—35 turns No. 32 enameled wire close wound
Spacing between windings 41, 55 and 20''—½ inch
Winding form 60—7/16 inch diameter
Winding form 61—5/16 inch diameter
Spacing between axes of winding forms 60 and 61—⅞ inch
Condenser 19''—20 micromicrofarads
Condenser 29—25 micromicrofarads
Condenser 44—approximately 15 micromicrofarads
Intermediate frequency—10.7 megacycles From the above description of the invention, it will be apparent that a wave-signal transformer embodying the invention has the advantage that one or more of a plurality of windings of the transformer may be tuned by movement of one or more magnetic cores without at the same time undesirably disturbing the magnitude of coupling between several closely grouped and coupled windings of the transformer. At the same time, movement of the magnetic cores does not undesirably disturb a winding or windings normally operated to obtain balanced induced wave-signal voltages. A transformer embodying the invention has the additional advantages that it is of simple and inexpensive construction wherein all of windings of the transformer may, if desired, be permeability tuned and thus is one possessing all of the desirable characteristics attendant upon permeability tuning.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal transformer comprising, a first winding adapted to be included in a circuit tuned to resonance at the frequency of a wave signal coupled to said winding, a plurality of other windings each having relative to said first winding a wave-signal potential ratio substantially equal to that of the others of said last-mentioned windings, and a movable unitary magnetic core coupling said windings and movable as a unit axially of all of said windings to adjust the tuning of said resonant circuit by adjustment of the inductance of said first winding, said core having a length at least equal to the total effective axial length of all of said windings through which said core is axially movable and being of a length to maintain substantially undisturbed over the range of movement of said core the magnitude of coupling of said windings and the said equality of said potential ratios.

2. A wave-signal transformer comprising, a first winding adapted to be included in a circuit tuned to resonance at the frequency of a wave signal coupled to said winding, a plurality of other windings coaxially arranged with said first winding and each having relative to said first winding a wave-signal potential ratio substantially equal to that of the others of said last-mentioned windings, and a movable unitary magnetic core coupling said windings and movable as a unit axially the total length thereof to adjust the tuning of said resonant circuit by adjustment of the inductance of said first winding, said core having a length at least equal to the total effective axial length of all of said windings through which said core is axially movable and being of a length to maintain substantially undisturbed over the range of movement of said core the magnitude of coupling of said windings and the said equality of said potential ratios.

3. A wave-signal transformer for use in a frequency detector comprising, a transformer primary winding adapted to be tuned to resonance at a frequency within the range of a frequency-modulated wave signal coupled thereto, a first winding coupled to said primary winding and adapted to be tuned to resonate at said frequency, secondary winding portions for developing balanced wave-signal potentials, and a movable unitary magnetic core coupling said first winding and secondary winding portions and movable as a unit axially of all of said windings to adjust the tuning of said first-winding resonant circuit by adjustment of the inductance of said first winding, said core having a length at least equal to the total effective axial length of all of said windings through which said core is axially movable and being of a length to maintain substantially undisturbed over the range of movement of said core the magnitude of coupling of said first winding and secondary winding portions and the said balance of said secondary winding portions.

BERNARD D. LOUGHLIN.

REFERENCES CITED

The following references are of record in the file of this patent:

UNITED STATES PATENTS

| Number | Name | Date |
|---|---|---|
| 2,066,777 | Hartnett | Jan. 5, 1937 |
| 2,182,071 | Crossley | Dec. 5, 1939 |
| 2,411,003 | Sands | Nov. 12, 1946 |
| 2,439,277 | Walker | Apr. 6, 1948 |
| 2,441,116 | Mackey | May 4, 1948 |